United States Patent
Griffith

(10) Patent No.: US 9,494,462 B2
(45) Date of Patent: Nov. 15, 2016

(54) BALANCED INTENSITY DIFFERENTIAL PHOTO DETECTOR

(71) Applicant: Robert C. Griffith, Woodland Hills, CA (US)

(72) Inventor: Robert C. Griffith, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 98 days.

(21) Appl. No.: 14/622,158

(22) Filed: Feb. 13, 2015

(65) Prior Publication Data
US 2016/0238442 A1    Aug. 18, 2016

(51) Int. Cl.
*H01J 40/14*    (2006.01)
*G01J 1/42*    (2006.01)
*G01J 1/44*    (2006.01)

(52) U.S. Cl.
CPC .............. *G01J 1/4228* (2013.01); *G01J 1/44* (2013.01)

(58) Field of Classification Search
CPC .............. H03F 3/45; H03F 2003/45022
USPC .............. 250/208.1, 214 R, 214 A; 327/514; 330/254, 270, 308
See application file for complete search history.

(56) References Cited

U.S. PATENT DOCUMENTS

| 5,134,276 A | 7/1992 | Hobbs |
| 5,742,200 A | 4/1998 | He |
| 6,313,458 B1* | 11/2001 | Okamoto ............. H03G 3/3084 250/214 A |
| 2007/0194846 A1* | 8/2007 | Randlett ................. H03F 1/08 330/254 |

OTHER PUBLICATIONS

Zhou, Qi, and Zhigang Wang. "A DC-Servo baseline restorer and its implementation in biomedical instrumentation," *ICMIT 2005: Merchatronics, MEMS, and Smart Materials*. International Society for Optics and Photonics, 2005.

* cited by examiner

*Primary Examiner* — Kevin Pyo
(74) *Attorney, Agent, or Firm* — Tarolli, Sundheim, Covell & Tummino LLP

(57) ABSTRACT

A circuit includes a first photo detector and a second photo detector to receive a first and second light input signal, respectfully, to generate a first current output signal and second current output signal respectively in response to the respective light input signals. A current multiplier stage receives the second current output signal from the second photo detector to generate a multiplied current output signal that is greater than the magnitude of the second current output signal. A differential multiplier having a first current path receives a portion of the multiplied current output signal and a second current path that receives another portion of the multiplied current output signal. The first current path is in series with the first current output signal to facilitate balancing of currents between the first current output signal of the first photo detector and the second current output signal of the second photo detector.

20 Claims, 9 Drawing Sheets

BALANCED INTENSITY DIFFERENTIAL PHOTO DETECTOR

TECHNICAL FIELD

This disclosure relates to optical detection circuits, and more particularly to a system and circuit to provide a balanced intensity differential photo detector.

BACKGROUND

Various applications require detection and analog processing of optical signals. One such application includes a conventional detection circuit for optical signals that addresses the issue of common mode rejection of laser intensity noise by automatically adjusting the effective photocurrent of one of two detection diodes, and then subtracts the resulting effective photocurrents to minimize the common mode intensity noise. The photocurrent adjustment is performed by a differential pair of transistors. In the detection circuit, the photocurrent of the second photodiode is divided by 2x (where x is a variable close to one). In order for the resultant second photocurrent to equal the first photodiode current, the initial photocurrent of the second diode must be two times the photocurrent of the first photodiode. This requires that the intensity of the second beam is two times the intensity of the first beam. This constraint requires the reduction of the intensity of the first beam by optical means resulting in the reduction of detector sensitivity and a complication of the optics.

The conventional detection circuit also requires a photodiode bias voltage for each diode, where a positive bias voltage and a negative bias voltage is required. Photodiode bias voltages add complexity and noise to the photodiode generated currents. Such detection circuit only provides detection of the difference of the photo intensities and only closes the loop on an optimum direct current (DC) photo current match. Since the current servo loop is not perfectly linear, the optimum match at the signal carrier frequency is not optimized.

SUMMARY

This disclosure relates to a balanced intensity differential photo detector. In one aspect, a circuit includes a first photo detector and a second photo detector to receive a first light input signal and second light input signal to generate a first current output signal and second current output signal respectively in response to the respective light input signals. A current multiplier stage receives the second current output signal from the second photo detector to generate a multiplied current output signal that is greater than the magnitude of the second current output signal. A differential multiplier having a first current path receives a portion of the multiplied current output signal and a second current path that receives another portion of the multiplied current output signal. The first current path is in series with the first current output signal to facilitate balancing of currents between the first current output signal of the first photo detector and the second current output signal of the second photo detector.

In another aspect, a circuit includes a first photo detector and a second photo detector to receive a first light input signal and second light input signal to generate a first current output signal and second current output signal respectively in response to the respective light input signals. A current multiplier stage receives a current input signal derived from the second current output signal from the second photo detector to generate a multiplied current output signal that is greater than the magnitude of the second current output signal. A first differential multiplier having a first current path receives a portion of the multiplied current output signal and a second current path that receives another portion of the multiplied current output signal. The first differential multiplier balances the currents between the first current output signal of the first photo detector and the second current output signal of the second photo detector based on the multiplied current output signal and a received balance signal that controls the first current path. A second differential multiplier generates the current input signal to the current multiplier stage based on the second current output signal from the second photo detector, and isolates a capacitance of the first and second photo detectors from an input to the current multiplier stage.

In yet another aspect, a system include a first photo detector and a second photo detector to receive a first light input signal and second light input signal to generate a first current output signal and second current output signal respectively in response to the respective light input signals. A current multiplier stage receives the second current output signal from the second photo detector to generate a multiplied current output signal that is greater than the magnitude of the second current output signal. A differential multiplier having a first current path receives a portion of the multiplied current output signal and a second current path that receives another portion of the multiplied current output signal. The differential multiplier balances the currents between the first current output signal of the first photo detector and the second current output signal of the second photo detector based on the multiplied current output signal. A gyroscope generates the first light input signal and the second light input signal based on the angular orientation of the gyroscope.

DETAILED DESCRIPTION

This disclosure relates to a balanced intensity differential photo detector circuit and system. This includes providing differential detection circuits having self-balancing detection capabilities between photo detectors in the circuit. One improvement over conventional detection circuits is the mitigation of the need for one of the differential inputs of the detection circuit to be twice as large as the other as is required in conventional detector circuits. This also mitigates the need to bias the photo detectors (eliminating bias noise), while providing the ability to output both the difference and the sum of the photo-currents, and the ability to tune the gain response of the circuit for optimum common mode rejection centered about a given frequency within the bandwidth of the detectors.

For the application of differential Faraday detection system such as a gyroscope detection system, this provides several advantages. In one example, a polarization detector system can be tuned to an even-balanced condition (e.g., a 50-50 split between two photo detectors) which is both the most sensitive point and the center of the linear response region (in contrast to unbalanced detectors). Also, the balanced detector circuit utilizes substantially all the photo current generated, rather than dividing down the current from one detector as in conventional detector circuits. This also restores the full dynamic range of the system while maximizing common mode rejection over conventional unbalanced detectors.

Furthermore, by mitigating photo detector bias voltages, it is possible to incorporate an intensity (sum of the two photo detectors) output that can be used for wavelength locking or some other control or monitoring purpose (e.g., via a gyroscope tracking system). The detector circuit described herein also allows for powerful self-balancing over a wide range of photo-current imbalance. The balanced detector circuit can also be tuned for maximum common mode rejection centered about a frequency of choice, rather than at zero frequency (e.g., DC optimization) as is common practice. The self-balancing steering of the circuit also provides low frequency differential measurement (frequencies below the control frequency). The primary differential output of the detector circuit then covers the frequency range from the photo detector balancing control frequency up to the frequency response limit of the detector circuit and system.

Figure 1:
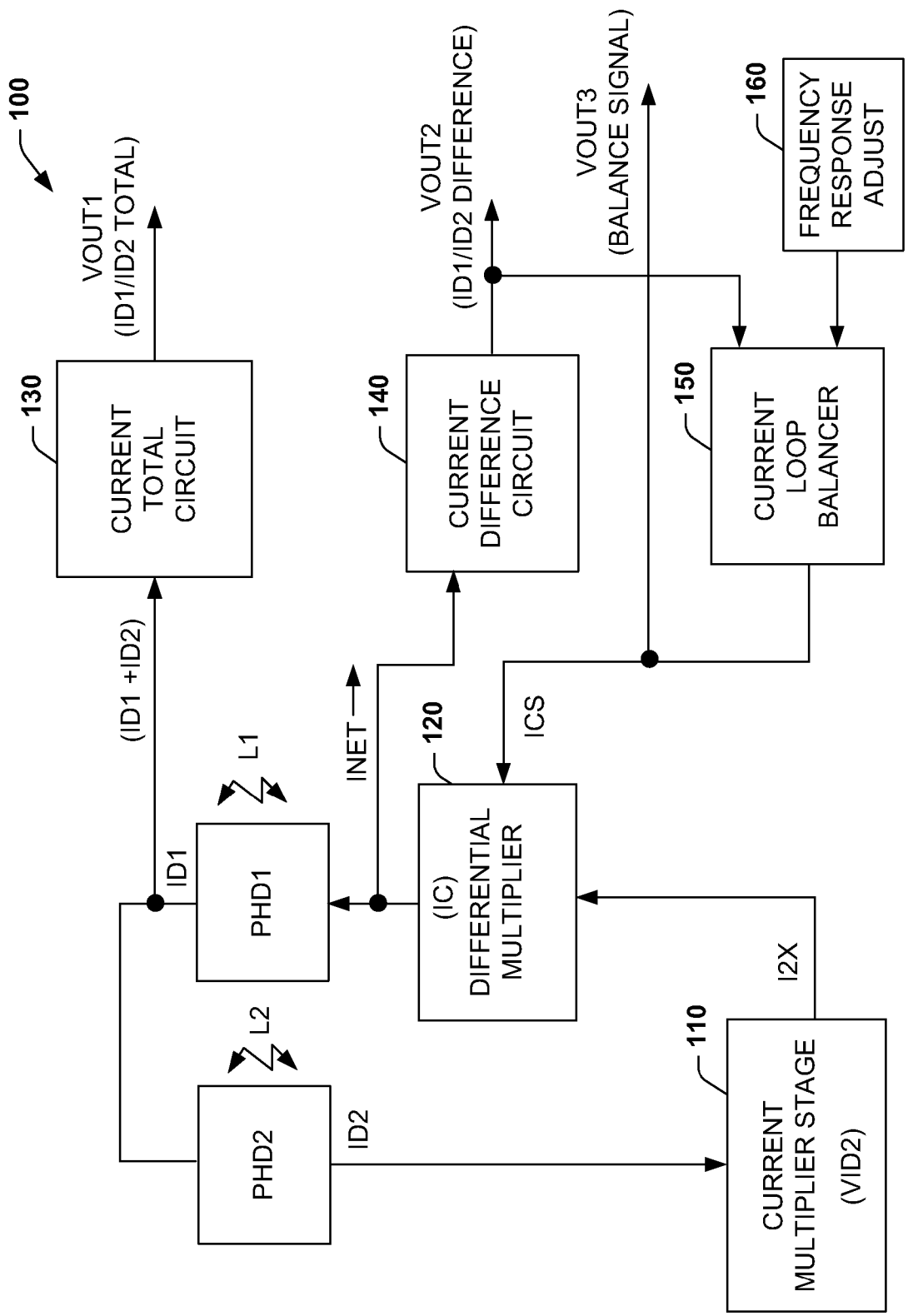
FIG. 1 illustrates an example of a circuit that provides a balanced intensity differential photo detector.

FIG. 1 illustrates an example of a circuit 100 to provide a balanced intensity differential photo detector. The circuit 100 includes a first photo detector PHD1 and a second photo detector PHD2 to receive a first light input signal L1 and second light input signal L2 to generate a first current output signal ID1 and second current output signal ID2 respectively in response to the respective light input signals. As used herein, the term photo detector can include substantially any detection device that converts light to a current such as a photo diode or a photo transistor, for example.

A current multiplier stage 110 receives the second current output signal ID2 from the second photo detector PHD2 to generate a multiplied current output signal I2X that is greater than the magnitude of the second current output signal ID2 (e.g., about two times greater). A differential multiplier 120 having a first current path receives a portion of the multiplied current output signal I2X and a second current path that receives another portion of the multiplied current output signal I2X. The first current path is in series (e.g., See e.g., FIG. 2) with the first current output signal ID1 to facilitate balancing of currents between the first current output signal of the first photo detector PHD1 and the second current output signal ID2 of the second photo detector PHD2.

A current total circuit (CTC) 130 can be employed to provide an indication via VOUT1 (e.g., voltage proportional to current) of total photo detector current (ID1+ID2) between PHD1 and PHD2. A current difference circuit (CDC) 140 provides a difference indication via VOUT 2 between ID1 and ID2. If the circuit 100 is in balance (e.g., ID1=ID2) for example, then the output indication VOUT 2 from the CDC 140 is substantially zero. Feedback from the CDC 140 is supplied to a current loop balancer (CLB) 150 which adjusts current in the differential multiplier 120 via an ICS output signal. A frequency response adjust 160 (e.g., trim pot adjust) is provided to balance DC operating performance with a desired AC operating frequency for the circuit 100 as will be described in more detail below.

The circuit 100 can be employed as part of a light photo detector system such as part of a gyroscope system (See e.g., FIG. 4). The light photo detector system employs the intensity balanced differential detector circuit 100 for canceling noise (e.g., laser intensity noise) of an optical beam generated via the gyroscope, for example. The light photo detector system can include a beam splitter (not shown) for splitting the optical beam into two representative beams L1 and L2 that have substantially equal intensities and DC optical power. This is in contrast to conventional detector systems that typically set a 2:1 ratio between the respective beams and run an imbalanced current through PHD1 with respect to PHD2.

The light photo detector system further includes the first photodiode PHD1 configured to receive one of the two representative beams and to generate the corresponding current signal ID1, and the second photodiode PHD2 configured to receive the other representative beam and to generate the corresponding current signal ID2 where the two detectors represent a differential configuration. The currents ID1 and ID2 respectively include a direct current (DC) signal, which is representative of the noise of the optical beam (the DC optical power).

The circuit 100 includes circuitry configured to maintain a DC output voltage signal VOUT2 representing a faraday signal (FS) equal to zero by adjusting a magnitude of a DC collector signal shown as IC in the differential multiplier 120, which has a signal magnitude proportional to the DC current signal of ID1, to substantially match a magnitude of the DC current signal of ID2. As will be illustrated and described below with respect to FIGS. 2 and 3, the circuit 100 can include a transresistance amplifier, a servo-integrator amplifier, a pair of bipolar transistors, Q1 and Q2, which are configured as a differential pair, an adjustable transresistance amplifier and a differential voltage amplifier circuit to provide functionality described herein. The adjustable transresistance amplifier can be configured in the current multiplier stage 110 to receive the DC current signal of ID2, where the current multiplier stage 110 receives ID2 from PHD2 and generates an associated DC internal voltage signal shown as VID2. The signal VID2 can be supplied to a differential voltage amplifier circuit in the current multiplier stage 110 to produce a DC differential signal (I2X) that is about twice in signal magnitude of ID2.

A pair of bipolar transistors, (Q1 and Q2) in the differential multiplier 120 receives I2X and an integrating DC signal ICS from a servo-integrator amplifier in the CLB 150 to produce an internal signal shown as IC on one of the bipolar transistors, which has a magnitude proportional to the DC current signal of ID1. The signals IC and ID1 are supplied to a junction in the differential multiplier 120 to generate a net DC signal INET. The signal INET is directed to a transresistance amplifier in the CDC 140 to produce the difference signal VOUT2. If the signal IC=ID1, then INET is equal to about zero, and VOUT2 is driven to zero. Driving VOUT2 to zero also removes (cancels) the noise of the optical beam. However, if ID1 and ID2 are not equal (e.g., due to other noise acting upon the two representative beams) then IC≠ID1, which results in VOUT2 experiencing either, a positive or negative increase in a signal magnitude. The servo-integrator amplifier of the CLB 150 monitors VOUT2, and in response to detecting a condition where VOUT2≠0 begins integrating to generate ICS. The signal ICS is transmitted to the pair of bipolar transistors in the differential multiplier 120 to drive IC till IC substantially matches ID1 to return VOUT2 to substantially zero.

In an alternative aspect, a light photo detector system can be employed to generate VOUT2 that can be manually zeroed in response to user input, for example during calibration of the light photo detector system. To manually zero VOUT2, the adjustable transresistance amplifier in the CLB 150 can further receive adjustment from a trim pot in the frequency response adjust 160. The trim pot can be adjusted to directly manipulate a magnitude of ICS, which indirectly drives VOUT2, and thus effectively canceling noise of an optical beam.

In another aspect, a light photo detector system can be employed with tuning circuitry for tuning the system to cancel noise at a specific frequency other than noise at a DC frequency. The light photo detector system can include a potentiometer in the frequency response adjust 160 that is coupled through an input resistor to an inverting input terminal of the servo-integrator amplifier of the CLB 150 to bias the servo-integrator amplifier by adjusting a bias point. Adjusting the potentiometer in combination with an adjustable capacitor of the current multiplier stage 110 and the trim pot tunes the light photo detector system to reject noise (e.g., temperature noise) at a corresponding frequency in the optical beam. Thus, the frequency response adjust 160 can be employed to set both DC and AC characteristics of the circuit 100 where in some cases DC noise rejection can be traded off for higher AC noise rejection and vice versa depending on the adjustment setting. As shown, output VOUT3 from the CLB 150 can be sent to a subsequent device (e.g., gyroscope) indicating a servo balance signal.

Figure 2:
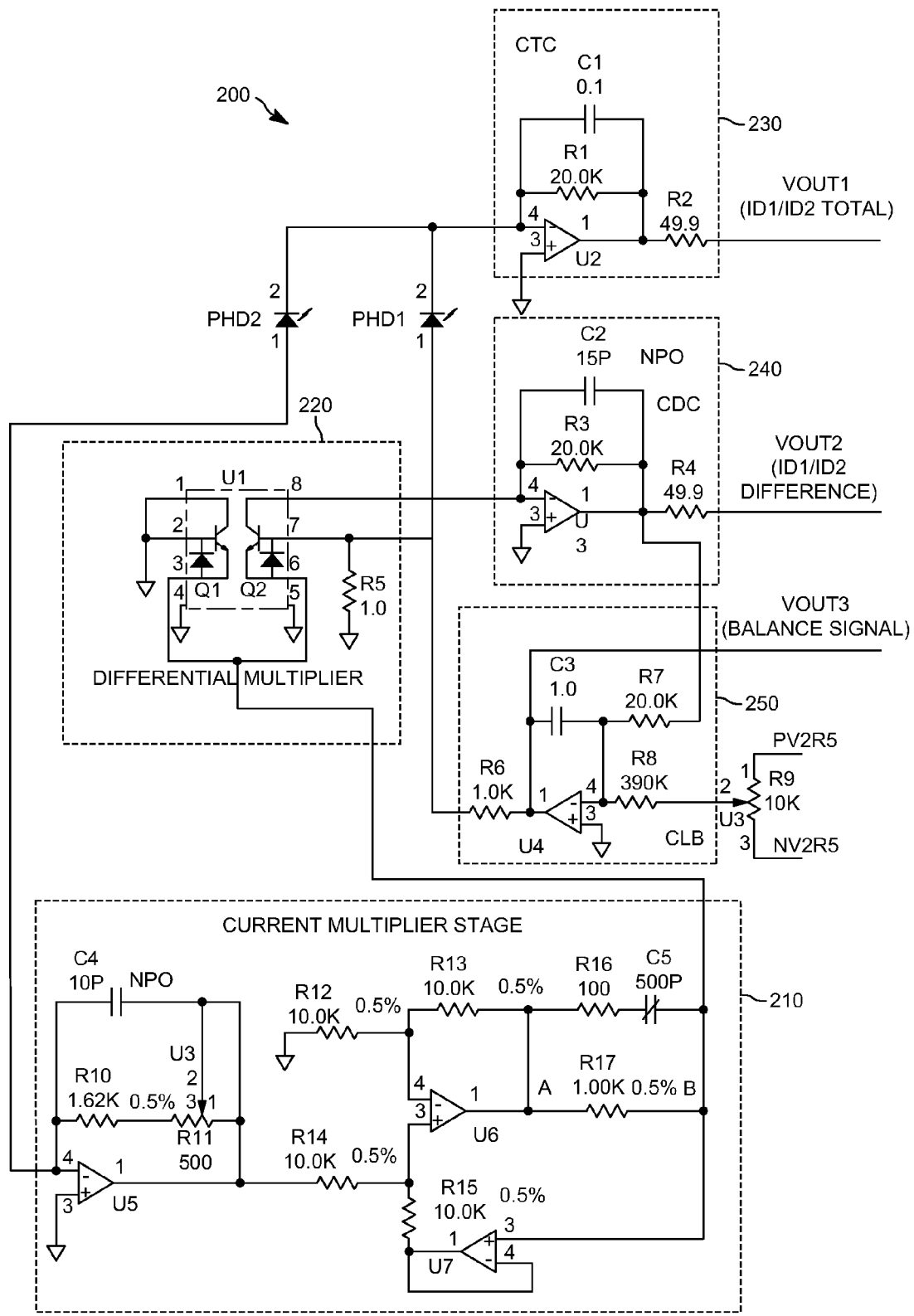
FIG. 2 illustrates an implementation example of a circuit to provide a balanced intensity differential photo detector.

FIG. 2 illustrates an implementation example of a circuit 200 to provide a balanced intensity differential photo detector. The circuit 200 provides a differential detection signal for a detection system, such as Faraday differential detection, that allows operation at the point of greatest sensitivity and linearity while obviating the requirement of a conventional circuit to have one photo current twice as large as the other. The circuit 200 provides high common mode rejection, self-balancing, and a maximally tunable common mode rejection frequency. Such differential optical detection can be employed for a wide array of sensors and systems, including magnetometers, gyroscopes, electric field sensors, clocks, and the like. The circuit 200 (and the other circuits described herein) can also be utilized more generically for the differential detections of substantially any pair of current source measurement systems.

The circuit 200 provides an improvement over conventional non-balanced detector circuits. The improvements over conventional detector circuits include a current multiplier stage 210 supplying a differential multiplier 220 resulting in substantially equal intensity of two photo detectors PHD1 and PHD2 (e.g., photo diodes) thus improving differential detection. Faraday detection systems benefit from equal intensity resulting in maximum sensitivity and linearity, for example. No bias of the photo detectors PHD1 and PHD2 is used returning the anode and cathode of both photo detectors to virtual ground for reduced noise. The circuit 200 also allows for the sum and difference of the two photo detector generated currents. This includes adjustable balance point for optimum common mode rejection about a frequency of choice, compensating for nonlinearity in the bandwidth of the multiplier circuits.

Before proceeding with a detailed operational description of the circuit 200, a general functional description is provided. The current multiplier stage 210 includes input amplifier U5 having feedback via potentiometer R11 and resistor R10. Capacitor C4 provides a filter in the feedback loop. Output from U5 drives differential amplifier U6 having input resistors R12 and R14 along with output resistors R13, R16, and R17. Adjustable capacitor C5 is provided for frequency adjustments as described herein. Amplifier U7 provides a gain of two from R17 back through resistor R15 to input of U6. The differential multiplier 220 includes transistors Q1 and Q2 in package U1 and receives input from the current multiplier stage 210 via the emitters of Q1 and Q2. As shown, output from PHD2 drives the current multiplier stage 210 whereas output from Q2 drives PHD1.

Current output from PHD1 and PHD2 is provided as a summation signal VOUT1 via current total circuit (CTC) 230. The CTC 230 includes amplifier U2 having feedback via R1 and C1 which drives an output via series resistor R2 to produce VOUT1. A current difference circuit (CDC) 240 receives difference current from Q2 of the differential multiplier 220. The CDC 240 utilizes amplifier U3 having feedback via R3 and C2 which drives series resistor R4 to produce difference output VOUT2. Output from the CDC 240 is fed to a current loop balancer (CLB) 250 which utilizes amplifier U4 as an integrator. The CLB 250 includes input resistors R7 and R8 and integrating capacitor C3 which drive output resistor R6 to control a current path in Q2 via base connection of Q2 of the differential multiplier 220. The base connection of Q2 also includes pull-down resistor R5. Potentiometer R9 is provided as a frequency response adjustment to the CLB 250 and is further described below.

With respect to an operational description of the circuit 200, the operational amplifier (also referred to as op amp) U2 supplies PHD1 (photo detector) and PHD2 with a virtual ground. The op amp U2, resistor R1, and capacitor C1 form a transresistance amplifier, where resistor R2 is added to improve the high frequency stability of the transresistance amplifier with capacitive loading. The output of op amp U2 is a voltage equal to minus the product of the sum of the currents, generated by the two photo detectors PHD1 and PHD2, times the resistor R1, where VOUT1=−(−IPHD1−IPHD2)*R1. The photo detector's cathode currents are negative and result is a positive voltage at the output of U2 (e.g., assuming an ideal amplifier).

The light intensities exciting the two photo detectors PHD1 and PHD2 are substantially equal by design. The multiplier differential transistors Q1 and Q2 collector currents are balanced. In order to balance the transistor Q1 and Q2, the sum of their emitter currents is about two times the photo detector current of PHD2. It is noted that the transresistance amplifier U3 does not supply current when the system is balanced—this assumes that R9 is centered, where its function will be described below. In order to supply the emitters of Q1 and Q2 with the current the photo detector PHD2 current is multiplied by two—this will be adjusted by R11 and may vary slightly to compensate for differences in intensity, photo detector gain, and other component errors.

The current multiplier stage 210 consists of an adjustable transresistance amplifier U5, and a voltage to current multiplier U6 and U7. The output of op amp U5 is a voltage equal to minus the product of the photo detector current (IPHD2) times the resistors R10+R11. When at nominal balance, the resistance of R10+R11=about 2 k ohms which is the resistance of R17 times 2. Voltage ER10+ER11=−(IPHD2 (R10+R11)). The photo detector's anode current is positive and the result is a negative voltage at the output of the inverting amplifier U5—assuming an ideal amplifier.

The output of U5 drives a differential voltage amplifier consisting of op amp U6 and resistors R12, R13, R14, R15, loaded by resistor R17, where U7 is a buffer to supply R15 without loading the emitters of Q1 and Q2. The differential amplifier U5 has a gain of 1. The non-inverting input is R14 with the inverting input R12 returned to ground. When the output of U5 drives the non-inverting input R14 negative, the output of U6 drives R17 node A negative until the voltage across R17 is equal to the voltage at R14 (output of U5). R17 node B is connected to the emitters of Q1 and Q2. The voltage across R17 is equal to the voltage across R10+R11. The resistance ratio of R10+R11/R17 is about 2 to 1. Therefore, the current flowing through R17 and emitters of Q1+Q2 is about 2 times the current through R10+R11 resulting in a current equal to the current of photo detector PHD2 at the collector of Q2 (about half the current of the Q1, Q2 pair) to compare with the current of photo detector PHD1.

The difference of the two currents IPHD1 and the collector of Q2 drive the transresistance amplifier formed by op amp U3, resistor R3, and capacitor C2. Resistor R4 is added to improve the high frequency stability of the transresistance amplifier with capacitive loading. The difference current of photo detector PHD1 and the collector current of Q2 can be adjusted to approximately zero by rotating the trim pot R11. The current of Q2 is automatically adjusted by the servo loop formed by transistors Q1 and Q2, transresistance amplifier U3, an integrator formed by U4, C3, and R7, an integrator bias adjustment trimmer potentiometer R9 and input resistor R8, and scaling resistor pair R6 and R5 completing the loop from integrator U4 into the base of Q2.

With respect to the Q2 servo loop, the photo current generated by the anode of PHD1, and the servo controlled collector current of Q2, are summed at the input of the transresistance amplifier (U3, R3, and C2). The servo is nulled when the Q2 collector current is about equal to the photo current generated by PHD1 plus a small bias that results from an integrator bias current supplied by R8 when R9 is adjusted from its center value.

Assume for purposes of discussion that the bias trimmer potentiometer R9 is centered, resulting in zero integrator bias offset, and assume that the op amps are ideal and that Q1 and Q2 are ideal transistors of infinite beta and are matched (Q1 and Q2 are well matched, high beta transistors and require a small amount of servo correction to balance them). Also assume that R11 has been adjusted to provide 2 times the current of PHD2 at the emitters of Q1 and Q2. The servo is now balanced with the output of U4=0v, the bases of Q1 and Q2=0, and the collector current of Q1 and Q2 are substantially equal to each other and the current through the collector Q2 is equal to the current generated by PHD2. The sum of the current generated by PHD1 and the collector current of Q2 is equal to zero. The output of the transresistance amplifier U3 is equal to zero and the input to the integrator U4 is zero resulting in a stable null of the Q2 collector current servo.

In actual operation, the null can be disturbed by many factors such as temperature dependent amplifier offset current, gain, transistor mismatch, and so forth. When the current generated by photo detector PHD1 is greater than the current drawn by the collector of Q2, a current through R3 results in a negative voltage at the output of the transresistance amplifier U3. The voltage at the output of U3 drives the servo integrator U4 resulting in a positive going voltage at the output of U4. The output is scaled by R5 and R6 and then applied to the base of transistor Q2 resulting in an increase in the conduction of transistor Q2 until the Q2 collector current matches the current generated by the photo detector PHD1 and balance is restored.

The voltage at the output of the integrator op amp U4 is indicative of the offset in the balance of the servo. This voltage can be monitored while adjusting R11 until the monitored voltage is close to zero resulting in an accurate balance of the servo while centering the dynamic range. A function of balancing the currents through the two photo detectors is to substantially reduce the signal produced by the common mode photo currents of the two photo detectors PHD1 and PHD2, where the signal of interest generated by the two photo detectors are 180 degrees out of phase. The point where the DC (zero frequency) photo detector currents are balanced may not be the optimum balance point for the frequency of interest (e.g., the signal carrier frequency) due the mismatch in the frequency response of the photocurrents and current multiplier. The function of the potentiometer R9 and resistor R8 is to bias the servo to a point where the common mode rejection at the frequency of interest is maximized. The capacitor C5 is also adjusted to match the phase of the common mode photo detector signal resulting in maximum attenuation. Adjusting a combination of R11, C5, and R9 results in the maximum signal to noise ratio at the signal frequency of interest. The width of the common mode rejection band is suitably wide and includes the carrier's modulation sidebands, for example.

Figure 3A:
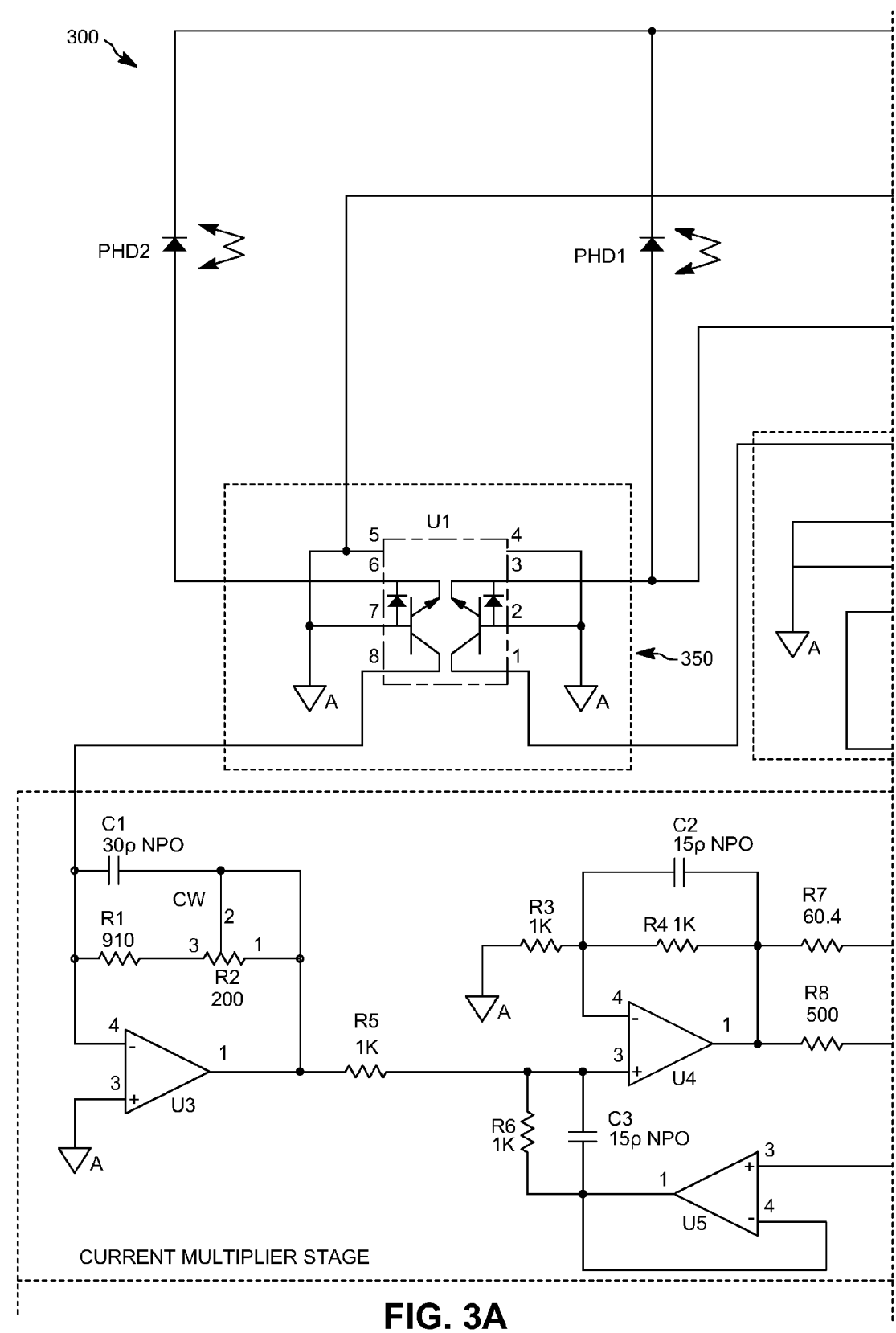
FIGS. 3A through 3C illustrate an alternative implementation example of a circuit to provide a balanced intensity differential photo detector, where an isolation stage provides frequency compensation for photo detector capacitance.
Figure 3B:
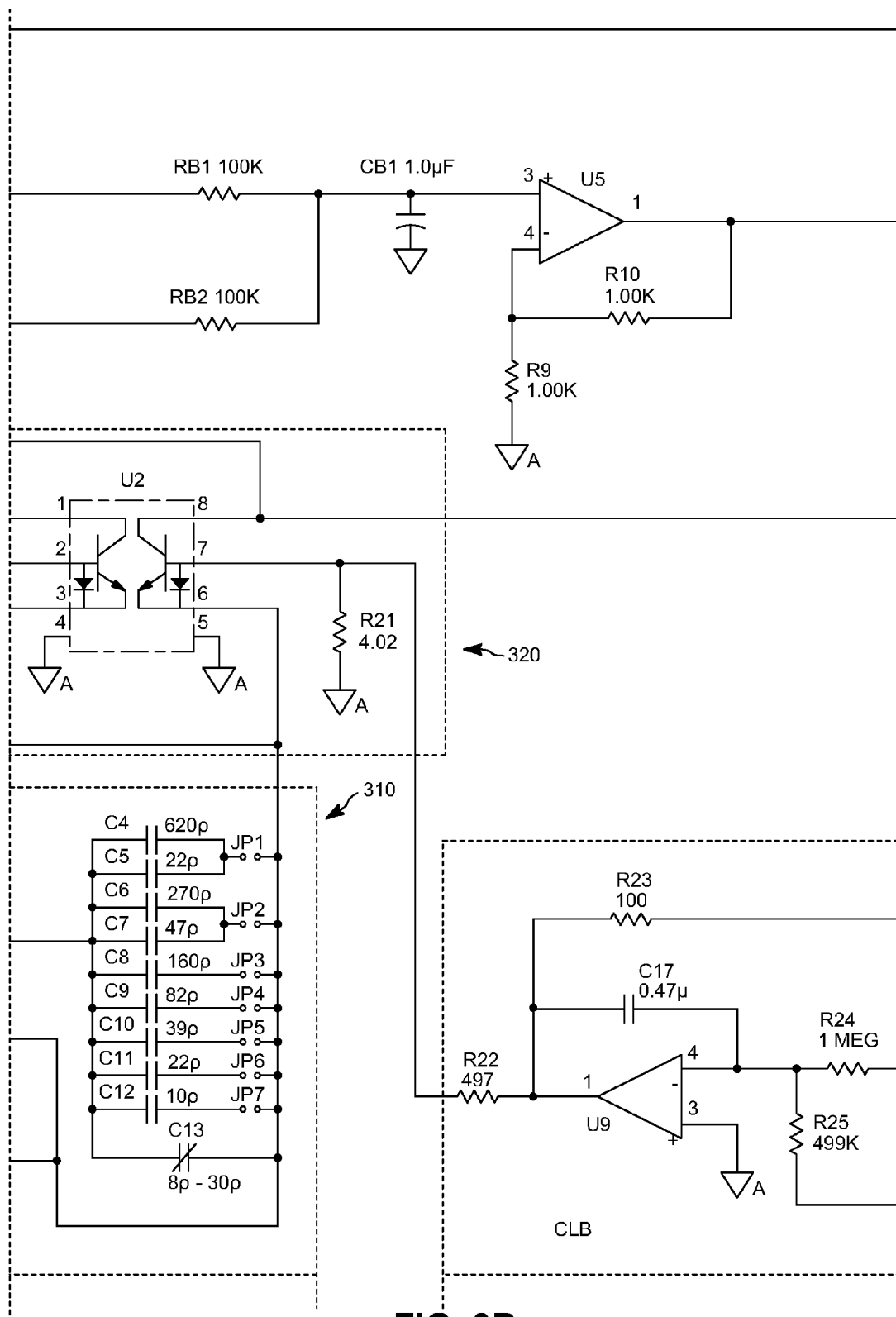
Figure 3C:
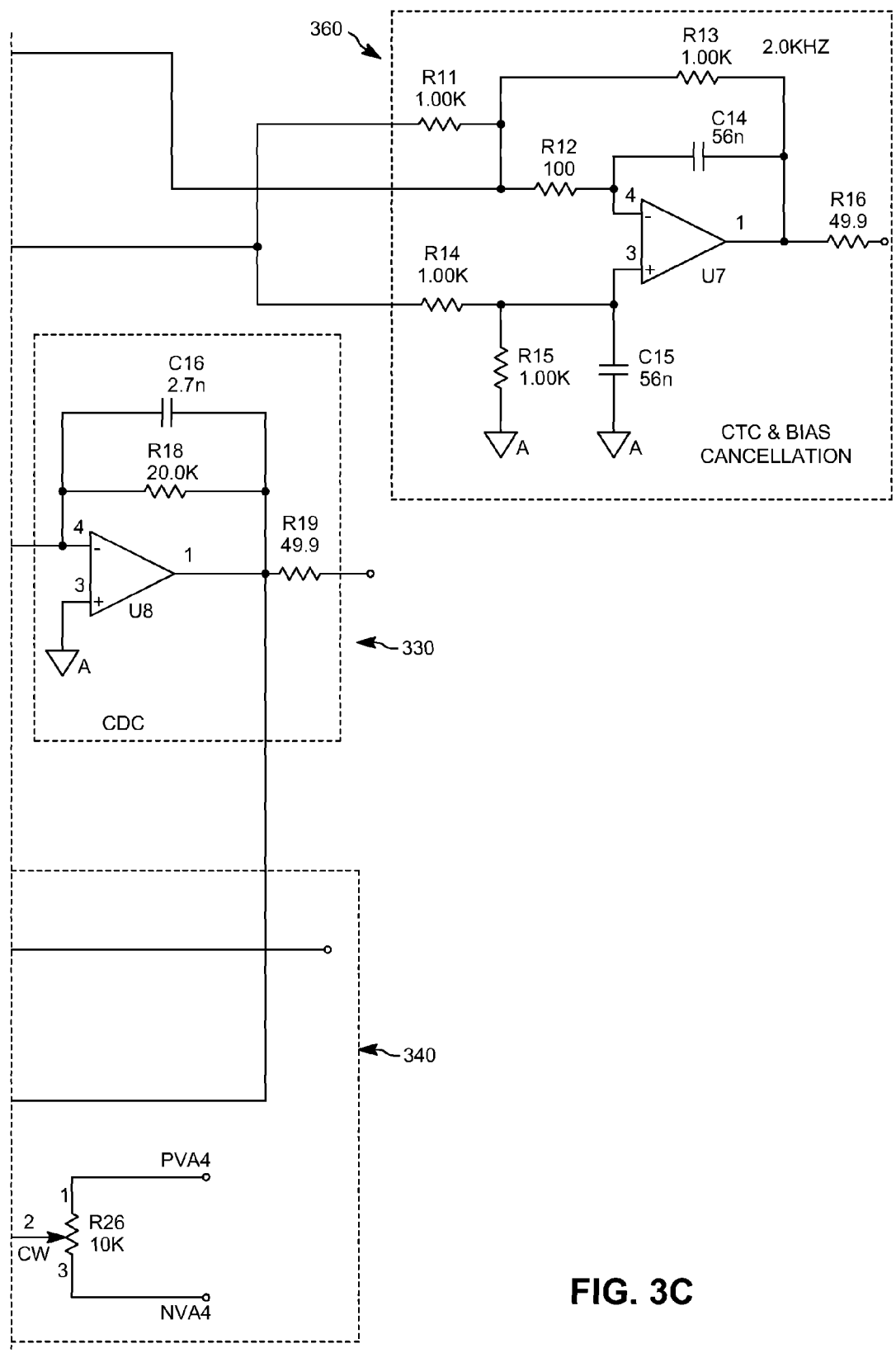

FIGS. 3A through 3C illustrate an example of a circuit 300 to provide a balanced intensity differential photo detector, where an isolation stage provides frequency compensation for photo detector capacitance. FIGS. 3A through 3C represent a collective circuit schematic diagram for the circuit 300, where the left most portion of the schematic is represented in FIG. 3A, the middle portion of the schematic is represented in FIG. 3B, and the right most portion of the schematic is represented in FIG. 3C. Each of the respective portions 3A-3C are collectively described as the circuit 300. Similar to the circuit 200 described above, the circuit 300 includes a current multiplier stage 310, differential multiplier 320, a current difference circuit (CDC) 330, and a current loop balancer (CLB) 340. In contrast to the circuit 200 of FIG. 2, the current multiplier stage 310 includes capacitors C4 through C12 which can be selected via circuit jumpers in addition to tunable capacitor C13 at the output of differential stage of amplifier U4. For purposes of brevity, each component in the circuit blocks 320 through 340 are not described due to their similarity to the circuits described above with respect to FIG. 2.

Instead of driving PHD1 directly via the differential multiplier 320, a second differential multiplier 350 is provided to isolate the capacitance of PHD1 and PHD2 from the input of the current multiplier stage 310. The isolation has the effect of shifting the pole formed by the PHD1 and PHD2 capacitance to a much higher frequency (e.g., from about 150 kHz to over 50 Mhz) and stabilizes the current multiplier stage 310. A current total circuit (CTC) and bias cancellation stage 360 can be provided to remove bias voltages appearing across PHD1 and PHD2 in addition to providing a voltage output representing the sum of the photo detector currents as provided previously by the CTC circuits described herein. Assuming a 0.6V bias across PHD1, for example, a gain of 2 amplifier U6 places 0.6V at the input of U7 in the CTC 360 via 50% voltage divider formed by R14 and R15. Resistors RB1, RB2 and capacitor CB1 improves balance between PHD1 and PHD2 by averaging the voltage across PHD1 and PHD2. The resistors RB1 and RB2 also balance the impedances seen by Q1 and Q2 of U1. The op amp U7 will also see 0.6V appear at its negative terminal which is fed back through resistor R12 to cancel the bias across PHD1 and PHD2. Additionally, U7 is configured as a differential amplifier in this example and provides a voltage output representing the sum of detector currents PHD1 and PHD2.

Figure 4A:
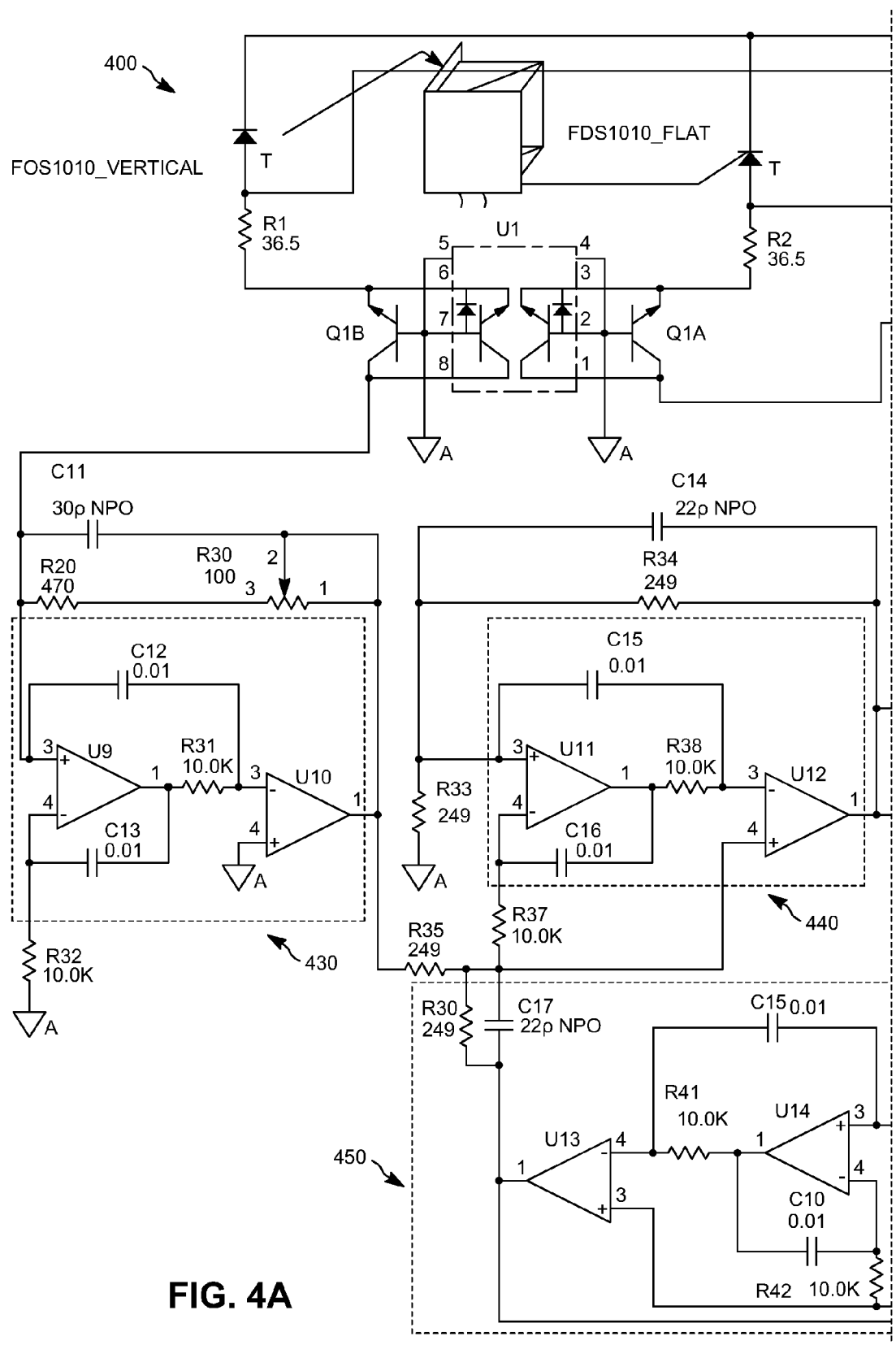
FIGS. 4A though 4C illustrate an alternative implementation example the circuit depicted in FIG. 3 to provide a balanced intensity differential photo detector.
Figure 4B:
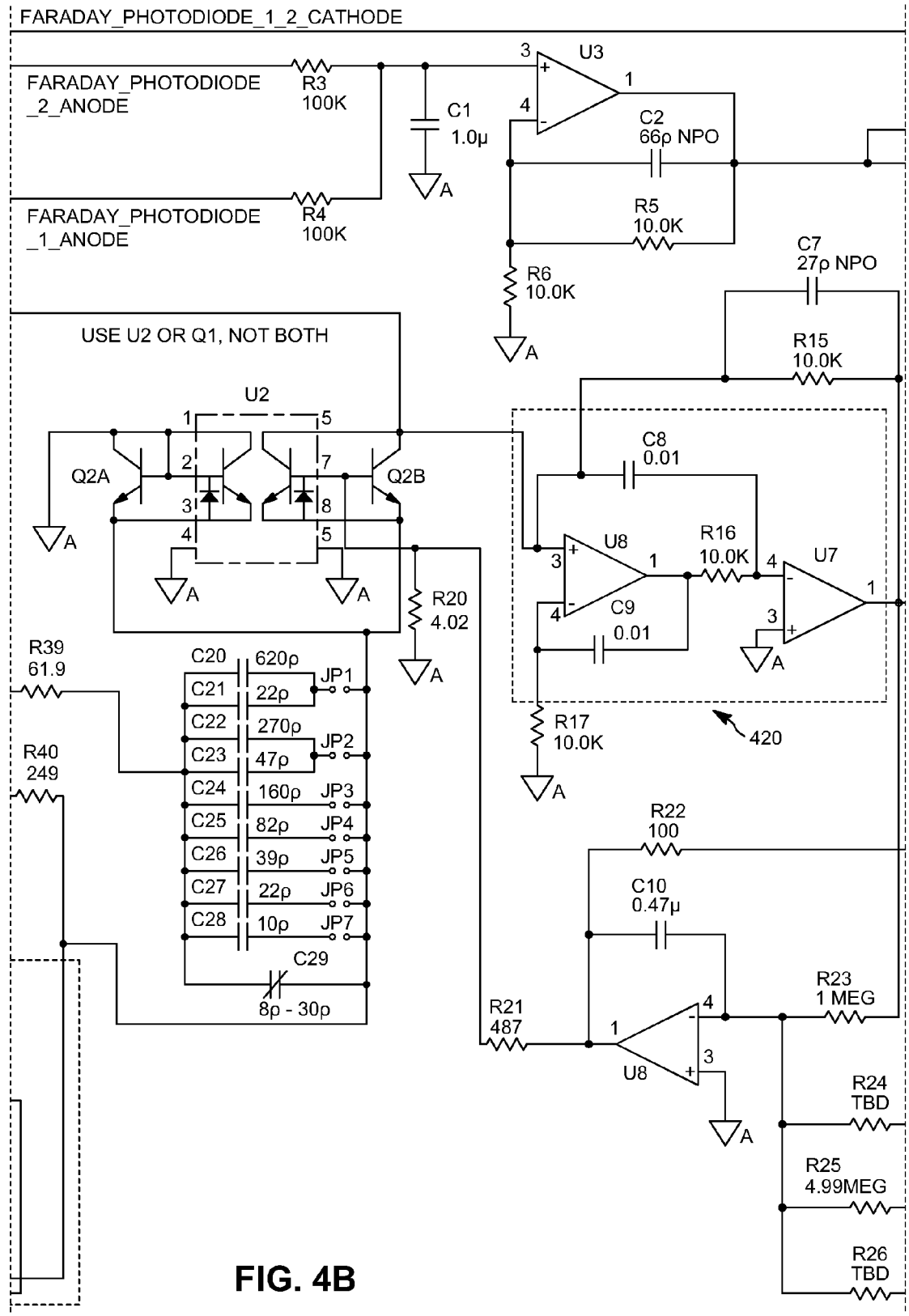
Figure 4C:
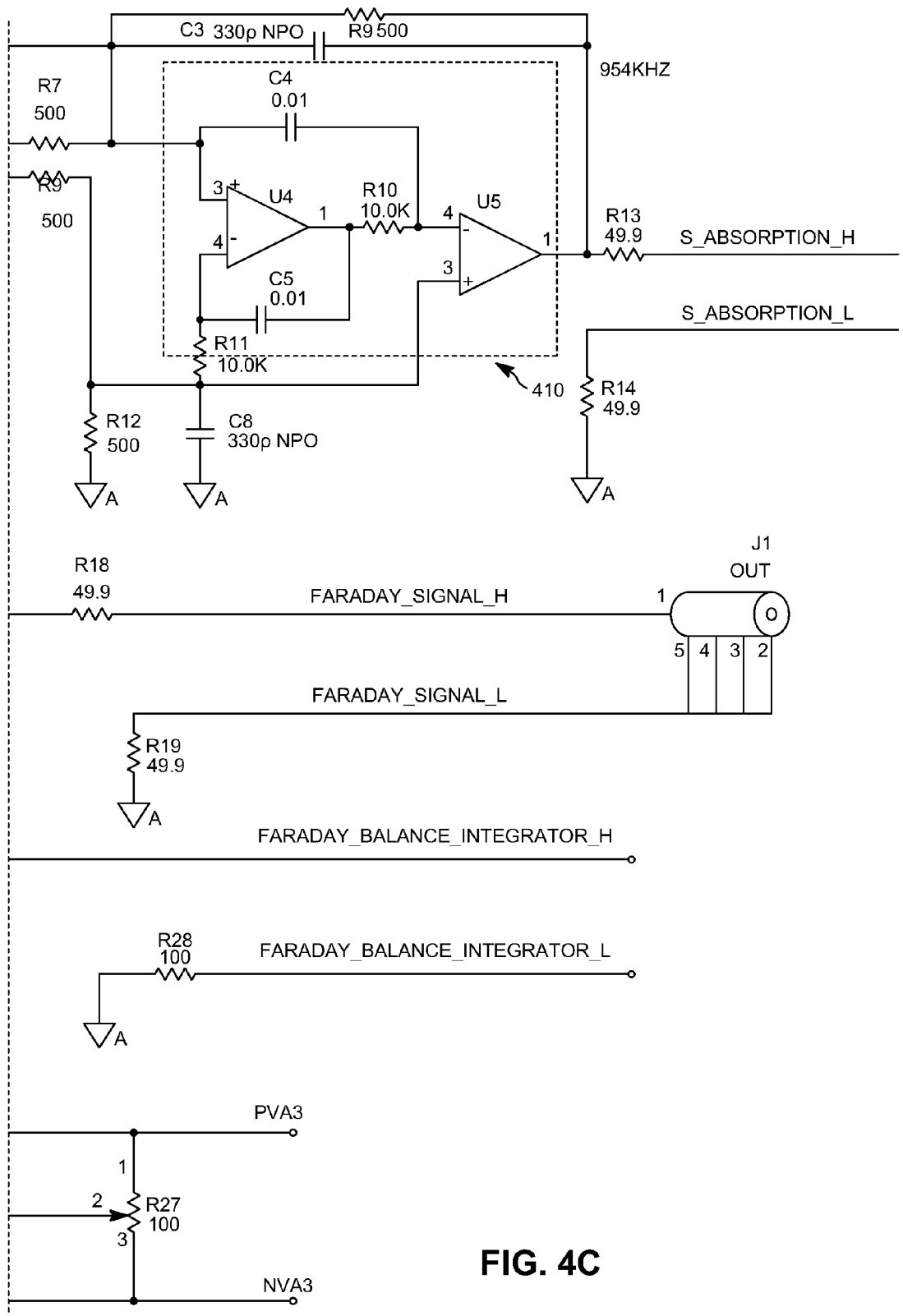

FIGS. 4A though 4C illustrate an alternative implementation example of the circuit depicted in FIG. 3 to provide a balanced intensity differential photo detector. FIGS. 4A through 4C represent a collective circuit schematic diagram for a circuit 400, where the left most portion of the schematic is represented in FIG. 4A, the middle portion of the schematic is represented in FIG. 4B, and the right most portion of the schematic is represented in FIG. 4C. Each of the respective portions 4A-4C are collectively described as the circuit 400. The circuit 400 provides substantially the same functionality as that depicted in FIGS. 3A through 3C above except that several single stage amplifiers from FIGS. 3A-3C are configured cascaded amplifier pairs to enhance low frequency 1/f noise. Each amplifier pair shown at 410, 420, 430, 440, and 450 include two cascaded amplifiers, where the first amplifier in each cascade is a chopper stabilized amplifier and the second amplifier is a high bandwidth amplifier. This combination results in an amplifier circuit for each stage 410 through 450 having a high DC input impedance, a stable DC offset and low 1/f noise due to the first operational amplifier in each cascade having a substantial (e.g., 80 MHz) high frequency bandwidth due to the second operational amplifier in each cascade. The combination circuit of each cascade appears to be a single very high performance operational amplifier.

Figure 5:
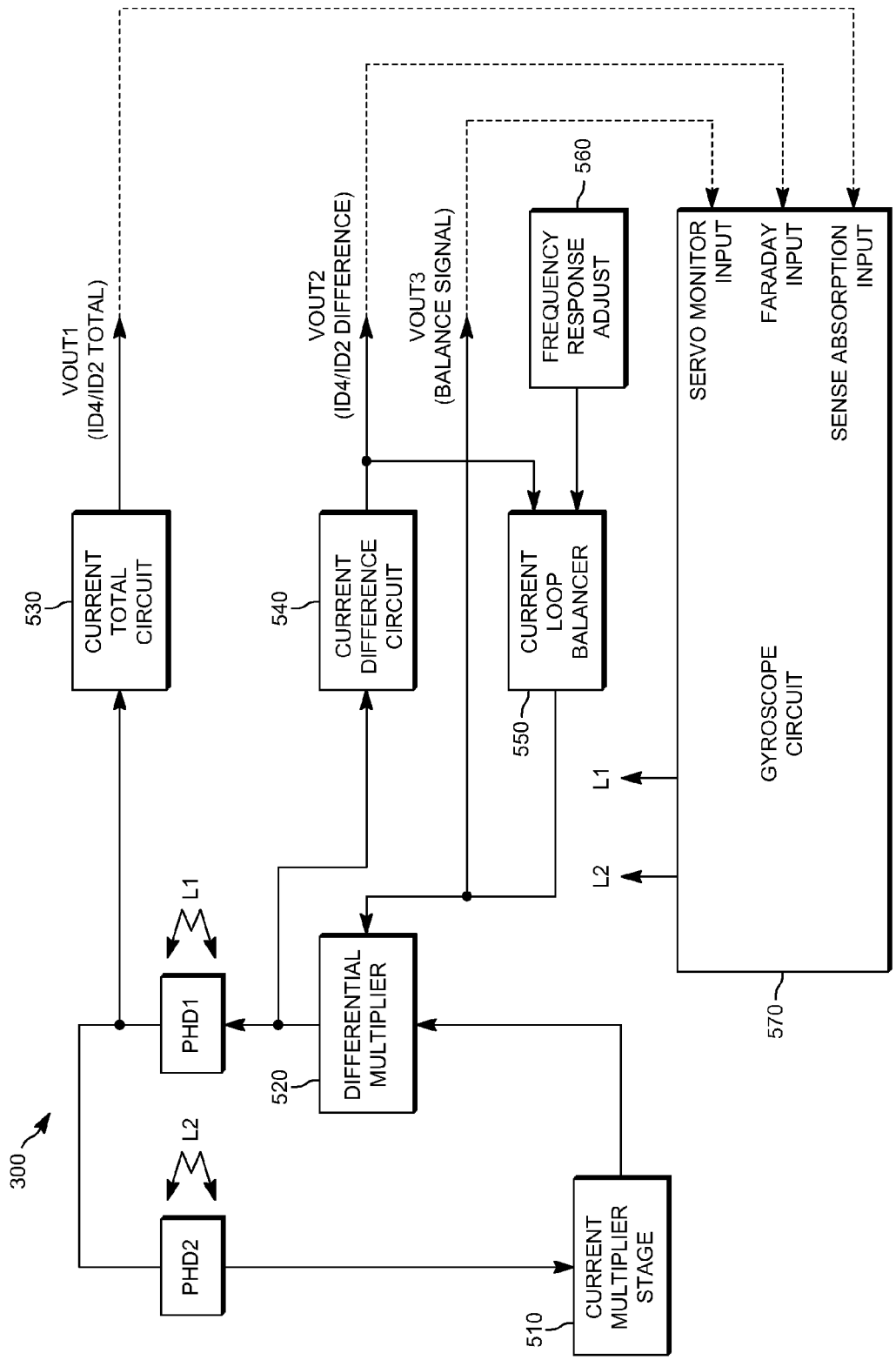
FIG. 5 illustrates an example of a system to provide a balanced intensity differential photo detector to detect signals from a gyroscope.

FIG. 5 illustrates an example of a system 500 to provide a balanced intensity differential photo detector to detect signals from a gyroscope. Similar to the circuits previously described herein, the circuit 500 includes a current multiplier stage 510 that receives current from detector PHD2 and drives current through detector PHD1 via differential multiplier 520, where the currents through the respective detectors are maintained substantially in balance. The circuit 500 also includes a current total circuit (CTC) 530 to provide voltage VOUT1 representing the sum of the photo currents in PHD1 and PHD2. The circuit 500 includes a current difference circuit (CDC) 540 to generate a voltage VOUT2 representing a difference between photo detector currents. A current loop balancer (550) controls the balance of current between PHD1 and PHD2 and also provides a balance signal VOUT3. A frequency response adjust 560 can be provided to adjust frequency characteristics of the circuit 500 as previously described herein.

In this example, a gyroscope circuit 570 is provided that interfaces within the context of the circuit 500. The gyroscope circuit 570 generates beam output L1 and L2 which are sensed by detectors PHD1 and PHD2 to detect angular orientation of the gyroscope. Inputs to the gyroscope circuit 570 include a sense absorption input connected to VOUT1 to monitor total photo current detected. A Faraday input is connected to VOUT2 where the difference in photo detector currents is utilized to detect angular changes of the gyroscope. A servo monitor input of the gyroscope circuit 570 receives the balance signal from VOUT3. In addition to gyroscopes, the balanced differential photo detection circuits and methods described herein can also be utilized for magnetometers, electric field sensors, and clocks, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
a first photo detector to receive a first light input signal and to generate a first current output signal in response to the first light input signal;
a second photo detector to receive a second light input signal to generate a second current output signal in response to the second light input signal;
a current multiplier stage that receives the second current output signal from the second photo detector to generate a multiplied current output signal that is greater than the magnitude of the second current output signal; and
a differential multiplier having a first current path that receives a portion of the multiplied current output signal and a second current path that receives another portion of the multiplied current output signal, wherein the first current path is in series with the first current output signal to facilitate balancing of currents between the first current output signal of the first photo detector and the second current output signal of the second photo detector.

2. The circuit of claim 1, wherein the current multiplier stage generates the multiplied current output signal at about twice the magnitude of the second current output signal based on the received second current output signal.

3. The circuit of claim 2, wherein the current multiplier stage includes an adjustable gain transresistance amplifier to generate the multiplied current output signal at about twice the magnitude of the second current output signal based on the received second current output signal.

4. The circuit of claim 3, wherein the current multiplier stage includes a differential amplifier to provide the multiplied current output signal from the adjustable gain transresistance amplifier to the input of the differential multiplier.

5. The circuit of claim 4, wherein the differential amplifier includes an adjustable capacitor in a feedback loop to adjust a phase of common mode photo detector signal.

6. The circuit of claim 1, further comprising a current total circuit (CTC) that provides a voltage output representing the total current of the first photo detector and the second photo detector.

7. The circuit of claim 1, further comprising a current difference circuit (CDC) that provides a voltage output representing a difference between current of the first photo detector and the second photo detector.

8. The circuit of claim 7, further comprising a current loop balancer (CLB) that is driven from the CDC and provides a servo feedback path to the differential multiplier to control current difference between the first and second photo detector.

9. The circuit of claim 8, wherein the CLB is configured as an integrator to provide a servo feedback path to the differential multiplier to control current difference between the first and second photo detector.

10. The circuit of claim 8, wherein the CLB receives a bias adjustment to adjust common mode rejection between the first and second photo detector at a frequency of interest.

11. The circuit of claim 1, further comprising a second differential multiplier to generate the current input signal to the current multiplier stage based on the second current output signal from the second photo detector, and to isolate a capacitance of the first and second photo detectors from an input to the current multiplier stage.

12. A circuit comprising:
   a first photo detector to receive a first light input signal and to generate a first current output signal in response to the first light input signal;
   a second photo detector to receive a second light input signal to generate a second current output signal in response to the second light input signal;
   a current multiplier stage that receives a current input signal derived from the second current output signal from the second photo detector to generate a multiplied current output signal that is greater than the magnitude of the second current output signal;
   a first differential multiplier having a first current path that receives a portion of the multiplied current output signal and a second current path that receives another portion of the multiplied current output signal, wherein the first differential multiplier balances the currents between the first current output signal of the first photo detector and the second current output signal of the second photo detector based on the multiplied current output signal and a received balance signal that controls the first current path; and
   a second differential multiplier to generate the current input signal to the current multiplier stage based on the second current output signal from the second photo detector, and to isolate a capacitance of the first and second photo detectors from an input to the current multiplier stage.

13. The circuit of claim 12, further comprising a current total circuit (CTC) that provides a voltage output representing the total current of the first photo detector and the second photo detector.

14. The circuit of claim 12, further comprising a current difference circuit (CDC) that provides a voltage output representing a difference between current of the first photo detector and the second photo detector.

15. The circuit of claim 14, further comprising a current loop balancer (CLB) that is driven from the CDC to generate the balance signal and provides a servo feedback path to the differential multiplier to control current difference between the first and second photo detector.

16. The circuit of claim 15, wherein the CLB receives a bias adjustment to adjust common mode rejection between the first and second photo detector at a frequency of interest.

17. A system, comprising:
   a first photo detector to receive a first light input signal and to generate a first current output signal in response to the first light input signal;
   a second photo detector to receive a second light input signal to generate a second current output signal in response to the second light input signal;
   a current multiplier stage that receives the second current output signal from the second photo detector to generate a multiplied current output signal that is greater than the magnitude of the second current output signal;
   a differential multiplier having a first current path that receives a portion of the multiplied current output signal and a second current path that receives another portion of the multiplied current output signal, wherein the differential multiplier balances the currents between the first current output signal of the first photo detector and the second current output signal of the second photo detector based on the multiplied current output signal; and
   a gyroscope to generate the first light input signal and the second light input signal based on the angular orientation of the gyroscope.

18. The system of claim 17, further comprising a current total circuit (CTC) that provides a voltage output representing the total current of the first photo detector and the second photo detector.

19. The system of claim 17, further comprising a current difference circuit (CDC) that provides a voltage output representing a difference between current of the first photo detector and the second photo detector.

20. The system of claim 19, further comprising a current loop balancer (CLB) that is driven from the CDC and provides a servo feedback path to the differential multiplier to control current difference between the first and second photo detector.

* * * * *